(12) United States Patent
Wielaard

(10) Patent No.: US 8,701,088 B2
(45) Date of Patent: Apr. 15, 2014

(54) GENERATING BACKTRACING INFORMATION FOR SOFTWARE DEBUGGING OF SOFTWARE PROGRAMS RUNNING ON VIRTUAL MACHINES

(75) Inventor: Mark J. Wielaard, Deventer (NL)

(73) Assignee: Red Hat, Inc., Raleigh, NC (US)

( * ) Notice: Subject to any disclaimer, the term of this patent is extended or adjusted under 35 U.S.C. 154(b) by 872 days.

(21) Appl. No.: 12/789,655

(22) Filed: May 28, 2010

(65) Prior Publication Data

US 2011/0296385 A1 Dec. 1, 2011

(51) Int. Cl.
*G06F 9/44* (2006.01)

(52) U.S. Cl.
USPC .......................... 717/124; 717/127; 717/130

(58) Field of Classification Search
None
See application file for complete search history.

(56) References Cited

U.S. PATENT DOCUMENTS

| | | | |
|---|---|---|---|
| 7,434,206 B2 * | 10/2008 | Seidman et al. ............... | 717/124 |
| 7,526,754 B2 * | 4/2009 | Bentolila ....................... | 717/124 |
| 7,689,558 B2 * | 3/2010 | Rossmann .................... | 717/130 |
| 7,818,721 B2 * | 10/2010 | Sundararajan et al. ........ | 717/130 |
| 7,823,129 B2 * | 10/2010 | Dimpsey et al. ............... | 717/124 |
| 8,321,838 B2 * | 11/2012 | Alpern ........................... | 717/124 |
| 8,336,033 B2 * | 12/2012 | Schmelter et al. ............ | 717/131 |
| 8,356,286 B2 * | 1/2013 | Schmelter et al. ............ | 717/128 |
| 2003/0204838 A1 * | 10/2003 | Caspole et al. ............... | 717/130 |
| 2004/0158819 A1 * | 8/2004 | Cuomo et al. ................. | 717/128 |
| 2007/0226700 A1 * | 9/2007 | Gal et al. ...................... | 717/128 |
| 2008/0141222 A1 * | 6/2008 | Alpern .......................... | 717/125 |
| 2010/0125834 A1 * | 5/2010 | Matic ............................ | 717/125 |
| 2011/0131561 A1 * | 6/2011 | Adams et al. ................. | 717/159 |
| 2011/0138366 A1 * | 6/2011 | Wintergerst et al. .......... | 717/130 |

OTHER PUBLICATIONS

Seragiotto et al. Analysis of Distributed Java Applications Using Dynamic Instrumentation. IEEE International Cluster Computing, Sep. 2005, pp. 1-10. Retrieved on [Nov. 22, 2013] Retrieved from the Internet: URL<http://ieeexplore.ieee.org/xpls/abs_all.jsp?arnumber=4154108&tag=1>.*
Pan et al.Reverse Analysis and Vulnerability Detection for Network System Software. 2009 IEEE International Symposium on Parallel and Distributed Processing with Applications, Aug. 2009, pp. 451-456, Rerieved on [Nov. 22, 2013] Retrieved from the Internet: URL<http://ieeexplore.ieee.org/stamp/stamp.jsp?tp=&arnumber=5207900>.*

* cited by examiner

*Primary Examiner* — Thuy Dao
*Assistant Examiner* — Cheneca Smith
(74) *Attorney, Agent, or Firm* — Lowenstein Sandler LLP

(57) ABSTRACT

A mechanism for generating backtracing information for software debugging of software programs running on virtual machines. A method of embodiments of the invention includes probing a virtual machine of a computer system, the virtual machine to run a software program, accessing compiler-generated output at a storage medium of the computer system, the compiler-generated output having debug information relating to the virtual machine, and obtaining the debug information from the compiler-generated output. The method further includes generating backtracing information of the software program using the debug information, and providing the backtracing information for debugging of the software program.

9 Claims, 4 Drawing Sheets

GENERATING BACKTRACING INFORMATION FOR SOFTWARE DEBUGGING OF SOFTWARE PROGRAMS RUNNING ON VIRTUAL MACHINES

TECHNICAL FIELD

The embodiments of the invention relate generally to software debugging and, more specifically, relate to a mechanism for generating backtracing information for software debugging of software programs running on virtual machines.

BACKGROUND

In software development, software debugging is a well-known process for performing diagnosis of software programs to detect and reduce defects, errors, and bugs by studying relevant information about a software program and its flow of execution. However, the success of a software debugging process depends on the difficulty of the programming language of the software program being debugged as well as on the ability of the debugger (which could be a software program or an authorized person, like a software developer). To make matters worse, today's techniques lack direct access to information necessary for performing debugging tasks and thus, they require additional software programs for collecting and providing relevant information for debugging. This not only wastes valuable resources, but also makes the debugging process slow, less efficient, and more convoluted.

For example, one conventional technique requires an extra library or function hook in a virtual machine ("VM") to extract the necessary information for debugging. One disadvantage of this technique is that it requires building a second program to serve as an extra access mechanism to access the relevant information which leads to inefficiency as well as consumption of valuable system resources and human time and labor. In addition to an access mechanism, this technique further requires a locking mechanism to maintain a proper VM state for the VM (since the VM has to run an extra function/thread that is controlled from outside). This technique is also not a viable solution for a tracer being a low overhead and non-intrusive debugging tool and not being capable of changing states of the software program and/or virtual machine on which the program is running.

Another conventional technique requires building an additional software program to create a lookup table of those core VM structures (e.g., sizes, offsets, etc.) that are necessary for inspection while compiling a source code into a machine code at a VM. This technique is convoluted and cumbersome to use given that a software developer/programmer is required to maintain an extra description of the internal VM structure design which, in turn, requires creating an entire table of VM addresses, compiling the VM source code, and linking extra tables to the VM, and the like.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for generating backtracing information for software debugging of software programs running on virtual machines. A method of embodiments of the invention includes probing a virtual machine of a computer system, the virtual machine to run a software program, accessing compiler-generated output at a storage medium of the computer system, the compiler-generated output having debug information relating to the virtual machine, and obtaining the debug information from the compiler-generated output. The method further includes generating backtracing information of the software program using the debug information, and providing the backtracing information for debugging of the software program.

Embodiments of the invention provide a flexible and efficient way to generate backtracing information of a software program running on/in a virtual machine using the compiler-generated (debug) information of the virtual machine itself. For example, the compiler- generated output (including debug output/information (e.g., DWARF debugging format)) on the virtual machine is accessed and relevant information is extracted from there that can be used to translate back to the source code that was originally used to describe the internal data structures. This is efficient in that using the compiler-generated information, there remains no need for identifying all the symbols in the virtual machine source code that are to be exported through a symbol table for the software program or library, hard coding of constants, or writing additional programs to extract the constants as the compiler performs these features when it compiles the source code and outputs the information in the compiler-generated output. The compiler-generated output describes internal data structures of the virtual machine program. Further, as long as the names of variables and data structure fields holding the relevant information remain the same, the same script can be used even if some of the information (e.g., data sizes or structure layout) relating to the virtual machine changes or when the virtual machine is recompiled.

Figure 1:
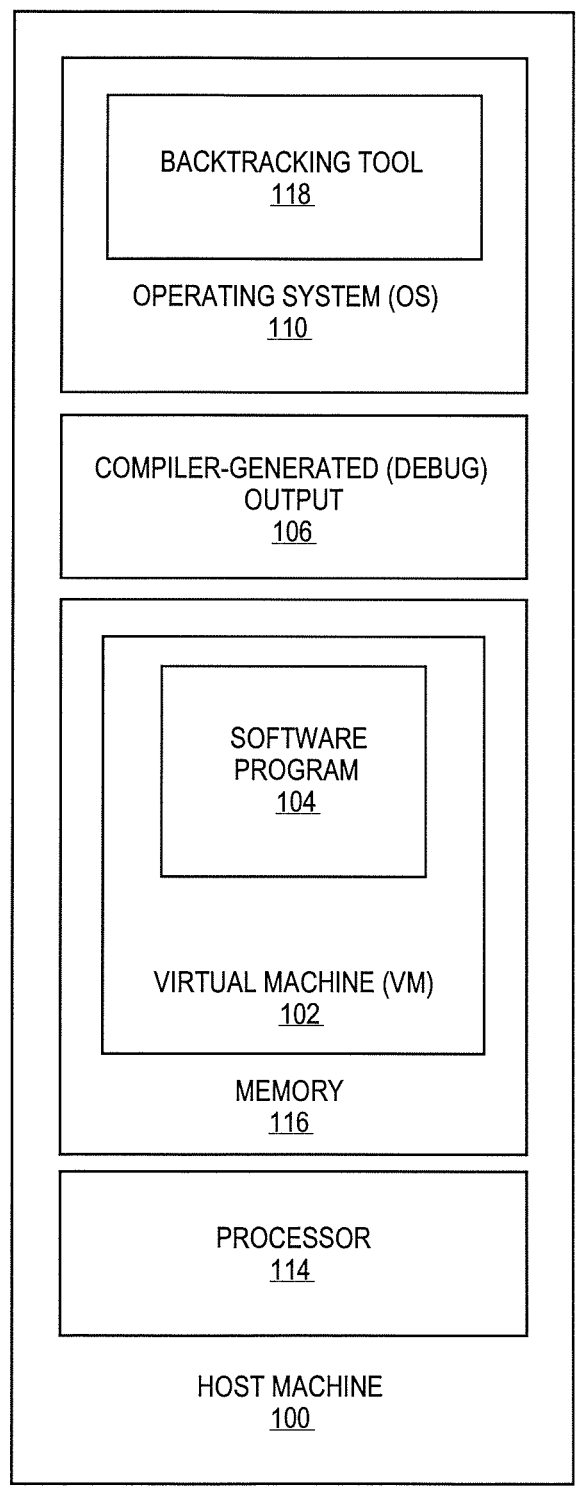
FIG. 1 illustrates a host machine employing a backtracing tool according to one embodiment of the invention.

FIG. 1 illustrates a host machine 100 employing a backtracing tool 118 to generate backtracing information according to one embodiment of the invention. Host machine 100 includes a computer system to host and execute a standard operating system ("OS") 110 and further includes a processor 114, memory devices 116, network devices, drivers, and so on. OS 110 may include a general operating system to serve as a host for software applications running on the host machine 100, an interface between the host machine 100 and user, and a manager of activities and allocator of resources of the host machine 100. Embodiments of the invention encompass host machine 100 being capable of hosting many VMs simultaneously, but only one VM 102 is shown here for purposes of brevity, clarity, and ease of explanation. Host machine 100 includes a server computer system and/or a client computer system.

VM 102 may include an intermediate compiler or an interpreter to transform software programs by compiling or interpreting them. For example, an intermediate compiler may include one or more computer programs to transform the source code or intermediate byte code of a software program 104 from a high-level programming language (e.g., C, C++, etc.) or an intermediate language (e.g. Java byte code) to a lower level language or object code (e.g., machine code, assembly language, etc.) such that software program 104 can become an executable program. VM 102 provides runtime environment for running the software program 104 on the VM 102. This runtime environment contains a compiler or an interpreter or both to facilitate the running of the software program 104. VM 102 further includes a local memory 108. A system compiler produces the VM 102 and the compiler-generated (debug) output 106 for the specific instance of the runtime environment.

Host machine 100 employs an embodiment of a backtracing tool 118 at OS 110. In one embodiment, backtracing tool 118 is part of the OS 110, while, in another embodiment, backtracing tool 118 runs on top of the OS 110 but has sufficient privileges to access internal information relating to the VM 102. Backtracing tool 118 accesses compiler-generated output 106 (e.g., debug output/information (e.g., DWARF format output)), stored on a storage disk or in memory (e.g., memory devices, such as a storage disk), which describes program data structures (e.g., program data structures, such as internal code tables or mappings) of the VM 102 of which an instance can be found in the local memory 116. Backtracing tool 118 uses the compiler-generated output 106 and program data structures to generate (e.g., create or recreate) backtracing information of the software program 104. This backtracing information can then be used for debugging of the software program 104 running on the VM 102. As aforementioned, this compiler-generated (debug) output 106 is generated and outputted by a system compiler that is also responsible for creating the VM (program) 102.

In one embodiment, backtracing tool 118 includes various components and modules to access and extract relevant information relating to the VM 102 to generate backtracing information (e.g., extracting backtraces or stacktraces (e.g., function call stacks)) of the software program 104 to be used for debugging the software program 104. Embodiments of generating backtracing information are performed manually upon initiation by a user (e.g., software developer, programmer) or automatically based on an occurrence of a predetermined time period or an event or a breakpoint in VM 102.

In one embodiment, backtracing tool 118 accesses, obtains, and combines the compiler-generated (debug) output 106 of the VM 102 (stored at memory 116 or other memory devices) and additional program data structures (in the address space of the VM 102) to (re)create backtracing information of the software program 104, without having to duplicate or replicate the compiler-generated output 106 and the program data structures, or access or change source codes of the VM 102 or software program 104. The backtracing information may then be provided to a debugger or a user in a user-friendly manner, such as in a graphical user interface (GUI) format to be displayed on a display device.

Figure 2:
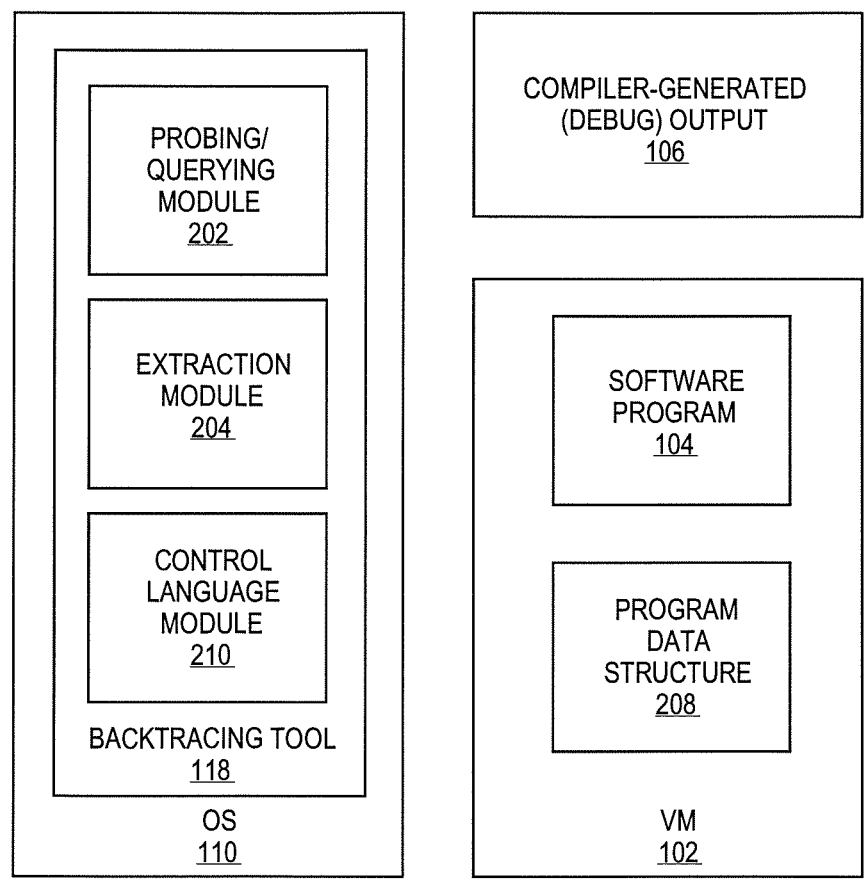
FIG. 2 illustrates a mechanism employing a backtracing tool for generating backtracing information according to one embodiment of the invention.

FIG. 2 illustrates a mechanism 200 employing a backtracing tool 118 for generating backtracing information according to one embodiment of the invention. In one embodiment, mechanism 200 employs a backtracing tool 118, at OS 110, for generating backtracing information relating to the software program 104 (e.g., Java software program) running on the VM 102 (e.g., Java VM ("JVM")) using information relating to the VM 102 itself, such as the debug information from compiler-generated output 106 and other data relating to the program data structures 208. For example, a backtrace or call stack (e.g., Java language backtrace) of a thread of the software program 104 running on the VM 102 is determined, using the backtracing tool 118, without replicating the compiler-generated output 106, additional program data structures 208, VM or software program source codes, or any other programs. In other words, backtracing tool 118 generates backtracing information of the software program 104 with some knowledge of the VM 102 (e.g., how it sets up its internal data structures), but without any knowledge of the software program 104 itself or having to access or make changes to either source code.

Although the compiler-generated output 106 (generated by a system compiler) does not describe the software program 104, but it does describe data structures (e.g., program data structures 208) of the VM 102 contained in the code mapping that provides the necessary identifiable parts of classes, methods, signatures, etc., of the software program 104. These identifiable parts are used by the backtracing tool 118 to guide in the process of unwinding the function call stack to generate backtracing information of the software program 104.

Certain information (e.g., debug information, such as DWARF format output) contained within the compiler-generated output 106 is sufficiently used by the backtracing tool 118 to determine, for example, where and which classes (e.g., Java classes) and methods of the software program 104 are, for example, being interpreted or JIT-compiled. Further, compiler-generated (debug) output 106 is sufficiently used by the backtracing tool 118 to retrieve, for example, a human-readable call stack relating to the software program 104 by combining the runtime Program Data Structures 208 inside the address space of VM 102 with the debug information of the compiler-generated (debug) output 106.

In one embodiment, certain information of VM 102 is extracted, through the backtracing tool modules 202, 204, 210, and that information is combined to reconstruct the backtrace of software program 104. Probing/querying module 202 of the backtracing tool 118 triggers the activation of probes in the VM 102. Extraction module 204 takes symbolic names of variables of interest as described though a script of the control language module 210. The script provides the symbolic names of the variables of interest at a certain probe point. Extraction module 204 looks up the location description of these variable names in the compiler generated debug output 106. The compiler generated debug output 106 contains tables that describe the location of certain variables based on the process counter. Thus, the extraction module 204 gets the program counter at the moment of the probe and uses that to get the correction location description of a variable. The location description points to a specific memory location inside VM 102 (either directly or through a register to which the extraction module already has access). Extraction module 204 then fetches the value of this memory location from the memory of VM 102. Control language module 210 guides the actions of the extraction module 204 and the probing/querying module 202, such as control language (or script or script language) module 210 interacts with the probing/querying and extraction modules 202, 204 based on the compiler-generated (debug) output 106 of the VM 102 to indicate, for example, where the probing/querying module 202 places triggers or probes and which registers or addresses the extraction module 204 should get.

The debug information for a variable contains the type of information (e.g., basic type, a number, a pointer, or more complex types like arrays and data structures) and the sizes of such constructs. The control language module script can also provide fields of data structures or indexes in arrays that contain relevant information. Extraction module 204 can use this to extract information given the location description of a variable it already has. The debug information gives it offsets from the location where an index into an array or the value of a field of a data structure can be found.

A specific example of using the aforementioned techniques is through extracting the name of a currently executing class and a method of software program 104 on VM 102 at the moment the probe triggers. For example, control language module 210 script describes the probe locations that are needed to be activated, which is done by the probing/querying module 202. When the probe triggers, extraction module 204 gets variable names from the script that need to be looked up to extract the relevant information. These variables identify the method descriptor in VM 102 that is currently active (in one embodiment, that is either found on the stack, or at the start of a specific code segment data structure in VM 102, as described by the compiler generated debug output 106). The script contains the relevant fields of the data structure that point to where the symbol table is stored in VM 102 that describes the class and method signatures of software program 104 that is being currently executed. By retrieving the strings from the memory pointed to by these data structures, extraction module 204 can provide a human readable description of the currently execution method of software program 104 to the user.

In one embodiment, backtracing tool 118 and its functions are independent of any particular VM, VM source code, software program, software program source code and no particular design modifications are needed to be made to the VM 102. Compiler-generated output 106 providing debug information may include a complete set of database of local and global symbol location descriptors (in memory, on the stack, or in processor registers) and data structure types and attributes describing data structure layout for debugging purposes. When the VM 102 is triggered or probed, the control language module 210 is used to provide a script to describe any actions that are to be taken, such as using symbolic names of local or global variables pointing to program data structures 208. These symbolic and field member names of data structures 208 are provided in the original human-readable source code and thus, no hardcoded constants or description of any sizes or offsets are needed.

Further, necessary translation of descriptions obtained from compiler-generated output 106 is provided to resolve and explain any symbols, data structures, and structure member names and to explicitly provide location expressions and register access patterns relating to the VM 102 that can then be used for debugging purposes of the software program 104. Further, a specific instance is described to retrieve a full symbolic backtrace of the software program 104 running on the VM 102. These processes of triggering, probing, extracting, obtaining, deducing, translating, explaining, describing, resolving, or the like are performed by the various modules 202, 204, 210 of the backtracing tool 118 on one VM 102 or, simultaneously, on multiple VMs. In case of multiple VMs, any relevant information use for generating backtracing information can be transported between the VMs.

Figure 3:
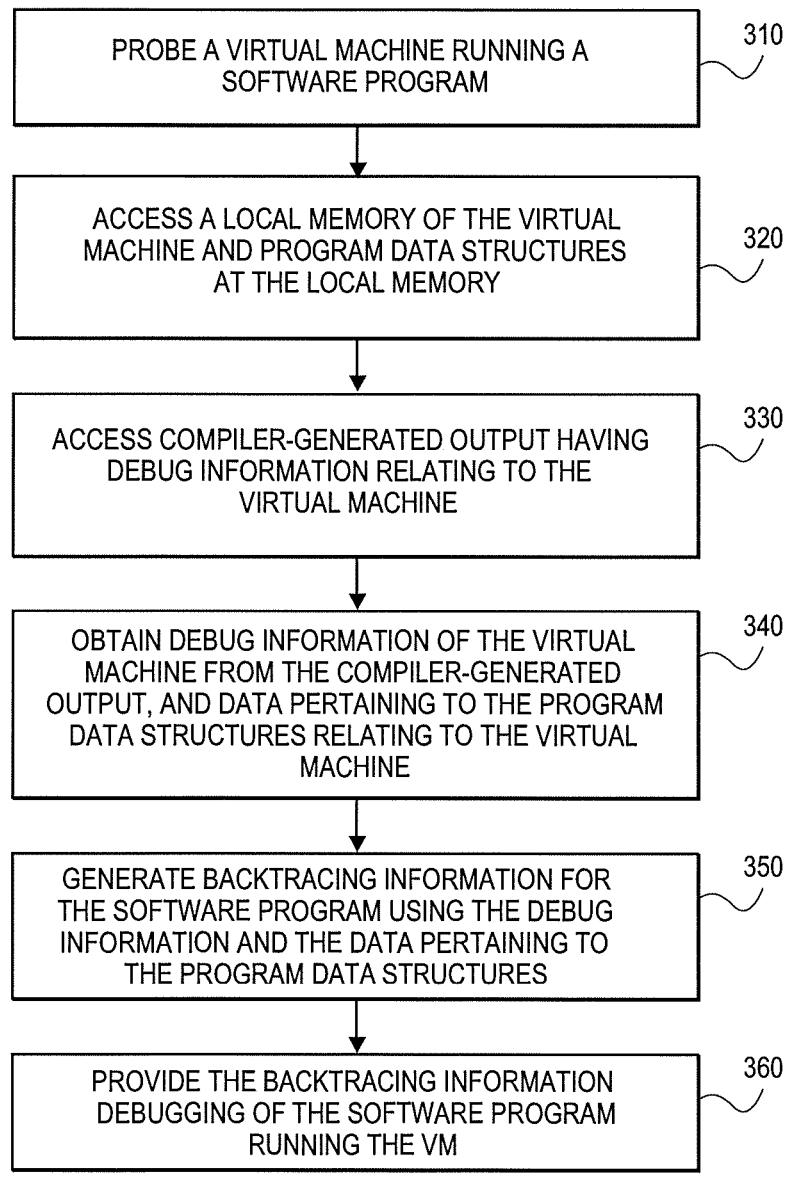
FIG. 3 illustrates a method for generating backtracing information of software program running on a virtual machine according to one embodiment of the invention.

FIG. 3 illustrates a method 300 for generating backtracing information according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by backtracing tool of FIGS. 1-2.

At block 310, a virtual machine running a software program is probed using a probing/querying module of the backtracing tool. The probing of the VM includes setting a trigger or probe in the address space of the virtual machine. At block 320, using an extraction module, registers/addresses and the local memory of the VM are accessed. The local memory may include program data structures relating to the VM. At block 330, compiler-generated output of the VM is accessed for debug information using the probing/querying module.

Control language module of the backtracing tool provides interaction between the probing/querying module and the extraction module and uses the debug information of the compiler-generated (debug) output to indicate where the probing/querying module sets the triggers/probes in the VM and which registers/addresses the extraction module should get. Further, the compiler-generated (debug) output describes data structures of the VM 102 contained in the code mapping that provides the necessary identifiable parts of classes, methods, signatures, etc., of the software program 104. These identifiable parts are used by the backtracing tool 118 to guide in the process of unwinding the function call stack to generate backtracing information of the software program 104.

At block 340, debug information from the compiler-generated (debug) output is obtained (from a system or other memory device), while additional data pertaining to program data structures relating to the VM is also obtained (from a local memory of the VM). At block 350, backtracing information of the software program is generated using the debug information and the data pertaining to the program data structures of the VM. At block 360, the backtracing information is provided for debugging of the software program running on the VM.

Figure 4:
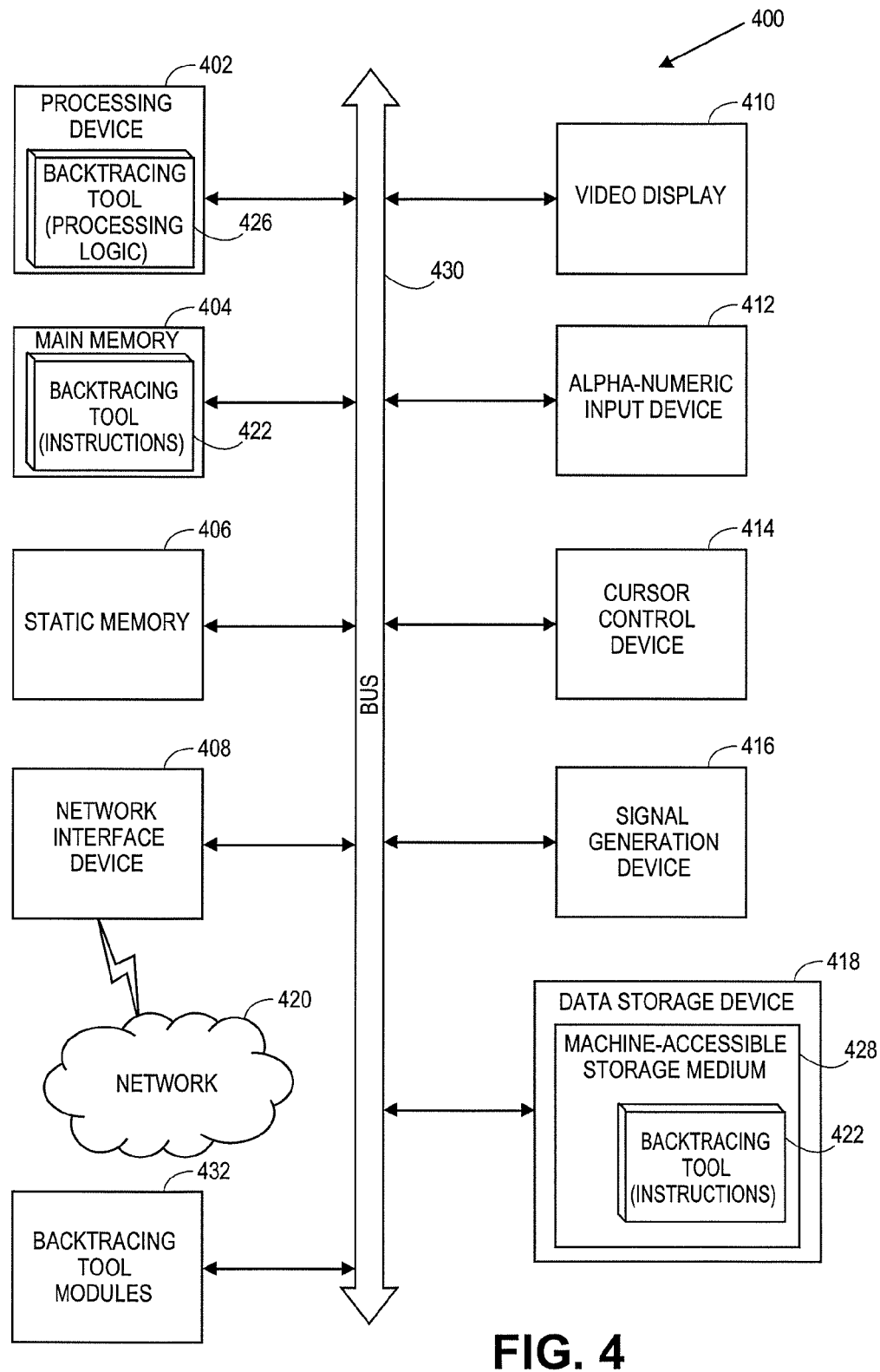
FIG. 4 illustrates a computer system for generating backtracing information according to one embodiment of the invention.

FIG. 4 illustrates a computer system 400 for generating backtracing information according to one embodiment of the invention. Within the computer system 400 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, random access memory (RAM), dynamic RAM (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC)

microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computer system 400 may further include a network interface device 408. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., backtracking tool) embodying any one or more of the methodologies or functions described herein. The backtracking tool may also reside, completely or at least partially, within the main memory 404 (e.g., backtracking tool (instructions) 422) and/or within the processing device 402 (e.g., backtracking tool (processing logic) 426) during execution thereof by the computer system 400, the main memory 404 and the processing device 402 also constituting machine-readable storage media. Further, for example, the backtracking tool instructions 422 may be transmitted or received over a network 420 via the network interface device 408.

The machine-readable storage medium 428 may also be used to store the backtracking tool (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Backtracking tool modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "probing", "accessing", "obtaining", "generating", "providing", "displaying", "creating", "verifying", "associating", "updating", "analyzing", "querying", "updating", "providing", "storing", "saving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display device.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
    probing a virtual machine of a computer system, the virtual machine to run a software program;
    accessing a compiler-generated output at a storage medium of the computer system, the compiler-generated output having debug information relating to the virtual machine;
    accessing program data structures at a local memory of the virtual machine, the program data structures relating to the virtual machine;
    obtaining the debug information from the compiler-generated output, wherein the compiler-generated output is generated by a system compiler, the system compiler to generate the virtual machine;
    providing a symbolic name of a variable at a probe point;
    determining, in the compiler-generated output, a memory location of the variable;
    fetching a value of the memory location from the virtual machine;
    indicating a trigger placement in view of the value of the memory location;
    generating backtracing information of the software program using the debug information and data pertaining to the data structures, wherein the debug information to describe the data structures and the trigger placement, wherein the generating the backtracing information comprises accessing runtime program data structures inside an address space of the virtual machine and combining the runtime program data structures with the debug information to generate a human-readable call stack relating to the software program; and
    providing the backtracing information for debugging of the software program.

2. The method of claim 1, further comprising obtaining data pertaining to the program data structures.

3. The method of claim 1, wherein the backtracing information comprises human-readable debugging information of the software program.

4. A system comprising:
    a processor communicably coupled to a memory, the processor to execute a virtual machine from the memory of a computer system; and
    an operating system having a backtracking tool to:
        probe the virtual machine running a software program,
        access compiler-generated output at a storage medium coupled to the computer system, the compiler-generated output having debug information relating to the virtual machine,
        access program data structures at a local memory of the virtual machine, the program data structures relating to the virtual machine,
        obtain the debug information from the compiler-generated output, wherein the compiler-generated output is generated by a system compiler, the system compiler to generate the virtual machine,
        provide a symbolic name of a variable at a probe point;
        determine, in the compiler-generated output, a memory location of the variable;
        fetch a value of the memory location from the virtual machine;
        indicate a trigger placement in view of the value of the memory location;
        generate backtracing information of the software program using the debug information and data pertaining to the data structures, wherein the debug information to describe the data structures and the trigger placement, and
        provide the backtracing information for debugging of the software program, and
        wherein the backtracking tool is further operable to access runtime program data structures inside an address space of the virtual machine and combine the runtime program data structures with the debug information to generate a human-readable call stack relating to the software program.

5. The system of claim 4, wherein the backtracing tool is further operable to obtain data pertaining to the program data structures.

6. The system of claim 4, wherein the backtracing information comprising human-readable debugging information of the software program.

7. A non-transitory machine-readable storage medium having instructions that, when executed by a machine, cause the machine to execute operations comprising:
    probing a virtual machine of a computer system, the virtual machine to run a software program;
    accessing compiler-generated output at a storage medium of the computer system, the compiler-generated output having debug information relating to the virtual machine;
    accessing program data structures at a local memory of the virtual machine, the program data structures relating to the virtual machine;
    obtaining the debug information from the compiler-generated output, wherein the compiler-generated output is generated by a system compiler, the system compiler to generate the virtual machine;
    providing a symbolic name of a variable at a probe point;
    determining, in the compiler-generated output, a memory location of the variable;
    fetching a value of the memory location from the virtual machine;
    indicating a trigger placement in view of the value of the memory location;
    generating backtracing information of the software program using the debug information and data pertaining to the data structures, wherein the debug information to describe the data structures and the trigger placement, wherein the generating the backtracing information comprises accessing runtime program data structures inside an address space of the virtual machine and combining the runtime program data structures with the debug information to generate a human-readable call stack relating to the software program; and
    providing the backtracing information for debugging of the software program.

8. The non-transitory machine-readable storage medium of claim 7, having further instructions that, when executed, cause the machine to perform operations comprising obtaining data pertaining to the program data structures.

9. The non-transitory machine-readable storage medium of claim 7, wherein the backtracing information comprises human-readable debugging information of the software program.

* * * * *